Oct. 26, 1943. D. O. ENES ET AL 2,332,704
DIE AND MOUNTING THEREFOR
Filed May 22, 1942
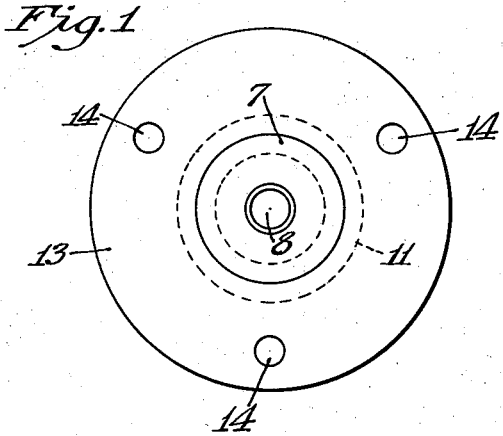
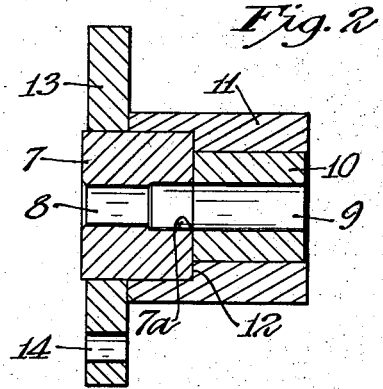
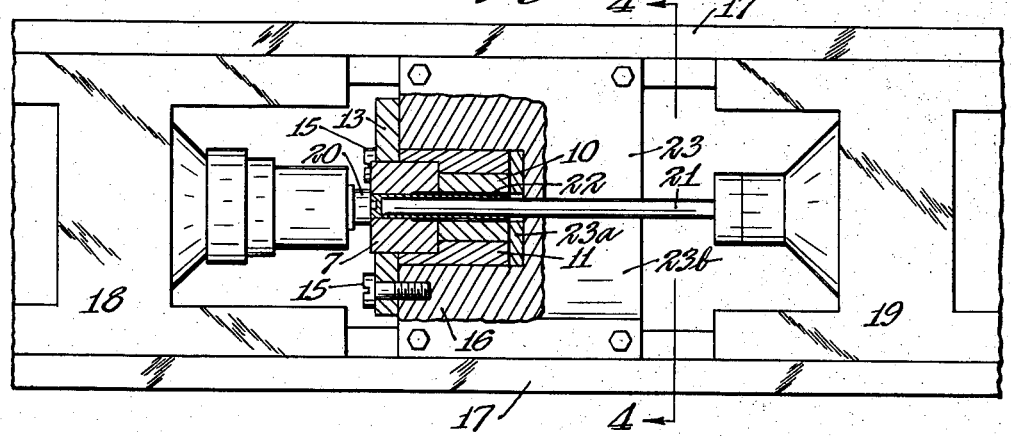
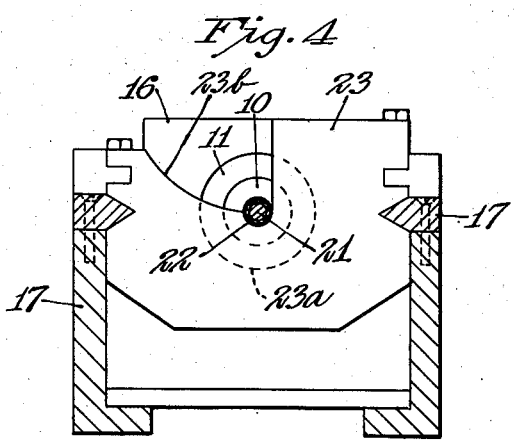
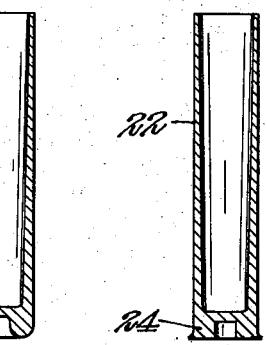
Inventors
Dorr O. Enes
Anthony J. Katches
By
Attorney Patented Oct. 26, 1943

2,332,704

UNITED STATES PATENT OFFICE 2,332,704

DIE AND MOUNTING THEREFOR

Dorr O. Enes, St. Paul, and Anthony J. Katches, Minneapolis, Minn.; said Katches assignor to said Enes Application May 22, 1942, Serial No. 444,126

13 Claims. (Cl. 78—60)

This invention relates to forming dies which are particularly, although not exclusively, adapted for use in high speed machines such as those used in forming the heads of cartridge cases.

The principal objects of our invention are to prolong the useful life of such dies, reduce the cost thereof and to minimize the damage done to the machine and the time consumed in repairs when, as sometimes occurs, one or more of the components of the work become jammed in the die.

With these objects in view, we provide a die having separable working and guiding members, only the former of which is made of tool steel. The guide member is protected against the application of severe stress and is free to shift its position slightly to thereby minimize frictional retarding of the components as they are guided to the working cavity. Our improved die members are confined in a sleeve which transmits the force of the heading operation directly from the working section of the die to the anvil or anvil block, thus relieving the pressure on the guide member and fixing the position of the working member independently of the guide member. As a safety feature, we prevent damage to the machine in case of jamming in the die by providing a relatively fragile connection between the die and supporting block so arranged that the die may be ejected with its contents before the force exerted by the ejecting mechanism, due to the obstruction in the die, exceeds a safe upper limit.

The accompanying drawing illustrates the best form of our invention at present known to us. Referring to the drawing:

Fig. 1 is a front end view of our improved die and its attachment collar;

Fig. 2 is a central longitudinal section through the die, sleeve and collar;

Fig. 3 is a part plan view and part horizontal section through a machine in which our improved die is mounted and showing the parts in their normal positions for forming the head of a cartridge case;

Fig. 4 is a cross section taken on the line 4—4 of Fig. 3, and

Figs. 5 and 6 are longitudinal sections respectively showing a cartridge case before and after the heading operation.

Our improved die has a main or working member 7 formed with a cylindrical exterior surface and an axial cavity 8 to receive the work. A guide passage 9 connects with the cavity 8 and is formed in a cylindrical guide member 10 of the die. The members 7 and 10 fit within a cylindrical sleeve 11 having an annular shoulder 12 against which an end of the member 7 abuts so that the longitudinally directed force of the heading operation is transmitted directly from the member 7 to the sleeve 11. Mounted on the head end of member 7, which projects from the sleeve 11, is a collar 13 formed with a cylindrical bearing and having a fragile connection with the die member. The connection is preferably formed by a fairly secure shrink fit so that the die members may be forced out of the collar 13 if the ejecting force reaches a predetermined, safe upper limit. Mild steel or other suitable, relatively soft metal may be used in the construction of the die member 10, sleeve 11 and collar 13 and only the working member 7 of the die must be constructed from high grade tool steel.

Holes 14 are provided in the collar 13 to receive bolts 15 for attaching the die assembly to the die block 16 of a machine such as that shown diagrammatically in Figs. 3 and 4. As illustrated, this machine has parallel guideways 17 on which are mounted a tool carriage 18 at the head end and a second tool carriage 19 at the tail end. A heading punch 20 is mounted on the carriage 18 and the tail carriage 19 supports an ejecting stem 21 which is disposed in axial alignment with the punch 20 and die cavities 8 and 9. The work, comprising the hollow blank or case component 22, fits over the end of the stem 21 and is forced into the die cavities thereon. Integral with the die block 16 is an anvil block 23 which is fixed on the machine frame and has a hardened steel anvil plate 23a fastened thereto for contact with the rear ends of the die member 10 and sleeve 11. The top of this block is formed with a recess 23b into which the components 22 are fed successively during the operation of the machine by feeding mechanism not shown.

In operation, reciprocating motion is imparted to the carriages 18 and 19, the motion being coordinated so that the tools are moved to and from the work in timed relation to each other and dwell momentarily in various positions during the cycle. Assuming that the cycle of operation starts with a component 22 in place on the anvil block 23, both carriages 18 and 19 being retracted from the work, the front end of the stem 21 enters the component as the carriage 19 starts to the left (Fig. 3) and then forces the component into the die, simultaneously ejecting the previously headed component if one is present in the die. It will be understood that the stem 21 advances the component 22 to a point where the head end of the component projects slightly from the front face of the die member. During this movement of the carriage 19, the carriage 18 is moving to the right. The punch 20 forms a head 24 (Fig. 6) on the component during the final portion of the stroke when the stem 21 is at the end of its forward stroke. Both carriages are thereupon retracted from the die, and the stem 21 receives a second component from the feeding mechanism. The second component, carried on the forward end of the ejecting stem 21, strikes the rear end of the one in the die and forces the latter out of the die cavity to the left (Fig. 3), this headed component dropping free of the die into a chute below. The stem 21 positions the second component in the die and a head is formed by the punch 20, as hereinbefore described. Thereupon both carriages 18 and 19 are retracted and the cycle of operation is repeated rapidly.

Occasionally, due to a defect, a component will stick in the die cavity so tenaciously that it cannot be pushed out ahead of the succeeding component. When this occurs, the second component is forced into the preceding one, forming an immovable obstacle in the die cavity. With the machines in general use, more or less serious breakage to the mechanism or destruction of the die has frequently been caused by such jamming in the dies. With our improved machine little or no damage is done because the fragile connection between the die member 7 and the collar 13 allows the die to be ejected ahead of the stem 21 in cases of jamming. It will be evident that both of the die members 7 and 10 may be forced to the left, as seen in Fig. 3, out of the collar 13, together with the jammed components within the die cavities, so that they drop clear before the heading punch 20 is advanced for the next heading operation. The machine is then stopped and the collar 13 replaced by that of another die. It has been found that delays due to such jamming are minimized because our replacement die may be installed quickly and easily while the obstruction is cleared from the ejected die and the collar replaced. Instead of the shrink fit forming the fragile connection between the working die and the dollar, one or more shear pins may be employed for the same purpose or other known forms of safety connection may be utilized between the die and supporting member of the machine.

To prevent scratching of the components and to insure their smooth passage from the guide members 10 into the die member 7, the annular lip or corner 7a of member 7 is slightly broken down or beveled and the adjoining periphery of the member 10 is similarly shaped. By transmitting the force exerted on the die member 7 during the head forging operation directly to the sleeve 11 and thence to the anvil block 23, we relieve the guide member 10 of this force and leave it free to merely perform its guiding function. It is free to rotate in the sleeve 11 and to shift its position to compensate for slight irregularities in the components.

We not only reduce the cost of the die by utilizing a minimum of expensive tool steel in its construction, but we also reduce replacement costs by prolonging the life of the die and by effectively guarding it against destruction and serious damage. Our short, compact working end portion of the die is relatively easy to harden and this promotes thorough and uniform hardening treatment. By severe tests we have shown that our invention greatly reduces the number of shut-downs due to jamming and the time required to return the machine to operation after a shut-down has been caused by jamming.

Having described our invention, what we claim as new and desire to protect by Letters Patent is:

1. A die of the class described comprising separable working and guide members disposed end to end and formed with connecting cavities for the work, the working member being constructed from relatively hard metal and the guide member from relatively soft metal, a sleeve embracing both of said members and formed to permit longitudinal removal of said members therefrom and means for fastening said members in a die block recess, said means being separable from the die members upon the application of excessive force directed longitudinally within said cavities.

2. A die of the class described comprising separable working and guide members disposed end to end and formed with connecting cavities for the work, a sleeve embracing both of said members and formed with an internal shoulder for engagement with an end of said working member and a collar having a bearing fitting the exterior of one of said members for fastening the die in a die block recess, said members being removable longitudinally through said bearing under excessive force directed longitudinally within said cavities.

3. A die comprising separable working and guide members disposed end to end, having cylindrical external surfaces and formed with connecting cavities, a sleeve embracing both of said members and formed with an internal shoulder for engagement with the inner end of said working member and a collar having a shrink fit upon the outer end of said working member for fastening the die to a die block.

4. In a die of the class described, a substantially cylindrical die member formed with an axially disposed cavity for the work, a collar having a shrink fit on the exterior of said member and means for fastening said collar to a die block, the die member being removable longitudinally through the collar under severe stress directed longitudinally in the die cavity.

5. In a die of the class described, a substantially cylindrical die member formed with an axially disposed cavity for the work, a collar fitting the exterior of said member and having a fragile connection therewith and means for fastening said collar to a die block, the die member being removable longitudinally from the collar under severe stress directed longitudinally of the die cavity.

6. In a forging machine having a die block, an anvil at one face of said block and tools operable from opposite faces of said block, the improvements which comprise working and guide die members disposed end to end and formed with connecting cavities for the work, an annular member engaging the working die member for fastening it to the die block and means for transmitting end thrust directly from the working die member to said anvil.

7. In a forging machine having a die block, an anvil at one face of said block and tools operable toward and from opposite faces of said block respectively, the improvements which comprise working and guide die members disposed end to end and formed with connecting cavities for the work, a sleeve embracing both of said die members and formed to transmit end thrust directly from the working die member to said anvil, independently of the guide die member, and means for retaining the die members in operative position on said die block.

8. In combination in a forging machine having a die block, an anvil at one face of said block and tools operable from opposite faces of said block, the improvements which comprise working and guide die members disposed end to end and formed with connecting cavities for the work, a sleeve embracing both of said die members and formed with an internal shoulder adapted to engage the inner end of the working die member and said sleeve engaging the anvil to transmit end thrust from the working die member to the anvil, independently of the guide die member, and the latter being free for slight movement within the sleeve, and means for retaining the die members in operative position on said die block.

9. In a forging machine having a die block, an anvil adjacent to one face of said block and tools operable to and from opposite faces of said block, the improvements which comprise working and guide die members disposed end to end and formed with connecting cavities for the work, a sleeve embracing both of said die members and formed with an internal shoulder for engagement with an inner end surface of the working die member, said sleeve engaging the anvil to transmit end thrust from the working die member directly to the anvil, a collar having a fragile connection with the outer end of the working die member and means for fastening said collar to said die block.

10. In a forging machine having a die block formed with a recess to receive a die, an anvil at one end of said recess, a heading tool operable toward and from the opposite end of said recess, a die fitting in said recess and having separable working and guide members interposed between said tool and anvil, said die members being formed with connecting cavities for the work and the working member being constructed from relatively hard metal and the guide member from relatively soft metal and means for automatically feeding work components longitudinally through the guide die member toward the heading tool and into the cavity in the working member.

11. In a forging machine having a die block formed with a recess to receive a die, an anvil at one end of said recess, a heading tool operable toward and from the opposite end of said recess, a die fitting in said recess and having separable working and guide members interposed between said tool and anvil, said die members being formed with connecting cavities for the work and the working member being constructed from relatively hard metal and the guide member from relatively soft metal, means for automatically feeding work components longitudinally through the guide die member toward the heading tool and into the cavity in the working member and means for releasing said die members upon the application of excessive force directed toward the heading tool during the movement of said components in said cavities.

12. In a forging machine having a die block formed with a recess for a die, an anvil at one end of said recess and a heading tool operable toward and from the opposite end of said recess, the combination of a die having separable working and guide members interposed between said tool and anvil, said die members being formed with connecting cavities adapted to frictionally engage work components and said working member being constructed from relatively hard metal and the guide member from relatively soft metal, means for forcibly feeding work components longitudinally through the guide die member toward the heading tool and into the cavity in said working die member and means for fastening said die in the die block recess against the normal force exerted during said feeding movement of the work components.

13. In a forging machine having a die block formed with a recess for a die, an anvil at one end of said recess and a heading tool operable toward and from the opposite end of said recess, the combination of a die having separable working and guide members interposed between said tool and anvil, said die members being formed with connecting cavities adapted to frictionally engage work components and said working member being constructed from relatively hard metal and the guide member from relatively soft metal, means for forcibly feeding work components longitudinally through the guide die member toward the heading tool and into the cavity in said working die member, a collar engaging the working die member and means for fastening said collar to the die block.

ANTHONY J. KATCHES.
DORR O. ENES.